United States Patent
Hessling et al.

(10) Patent No.: US 9,429,243 B2
(45) Date of Patent: Aug. 30, 2016

(54) ADJUSTABLE PRESSURE CONTROLLED VALVE

(75) Inventors: Terry John Hessling, Morris, MI (US); Scott Andrew Menko, Linden, MI (US)

(73) Assignee: Numatics, Incorporated, Novi, MI (US)

( * ) Notice: Subject to any disclaimer, the term of this patent is extended or adjusted under 35 U.S.C. 154(b) by 58 days.

(21) Appl. No.: 14/362,615

(22) PCT Filed: Dec. 14, 2011

(86) PCT No.: PCT/US2011/064813
§ 371 (c)(1),
(2), (4) Date: Jun. 4, 2014

(87) PCT Pub. No.: WO2013/089694
PCT Pub. Date: Jun. 20, 2013

(65) Prior Publication Data
US 2014/0326335 A1    Nov. 6, 2014

(51) Int. Cl.
| | |
|---|---|
| *F16K 17/06* | (2006.01) |
| *F16K 17/04* | (2006.01) |
| *G05D 16/18* | (2006.01) |
| *F16K 7/12* | (2006.01) |

(52) U.S. Cl.
CPC ............. *F16K 17/06* (2013.01); *F16K 7/12* (2013.01); *F16K 17/0453* (2013.01); *G05D 16/185* (2013.01); *Y10T 137/7747* (2015.04); *Y10T 137/7837* (2015.04); *Y10T 137/7879* (2015.04)

(58) Field of Classification Search
CPC ...... F16K 17/06; F16K 17/0453; F16K 7/12; G05D 16/185

USPC ............... 251/61.2–4, 116; 70/178, 183, 186
See application file for complete search history.

(56) References Cited

U.S. PATENT DOCUMENTS

| | | | |
|---|---|---|---|
| 1,730,305 A | * | 10/1929 | Stancu, Jr. ............... F16K 1/50 251/116 |
| 3,276,503 A | | 10/1966 | Kilmarx |
| 3,895,645 A | | 7/1975 | Johnson |

(Continued)

FOREIGN PATENT DOCUMENTS

| | | |
|---|---|---|
| CN | 1903597 A | 1/2007 |
| WO | 2004/088445 A1 | 10/2004 |

OTHER PUBLICATIONS

Notification of the First Office Action, Chinese Application Serial No. 2011800755345, Filing Date: Jun. 4, 2014, Mailing Date: Jul. 31, 2015 and Translation, 13 pages.

(Continued)

*Primary Examiner* — Kevin Murphy
*Assistant Examiner* — Daphne M Barry
(74) *Attorney, Agent, or Firm* — Reising Ethington P.C.

(57) ABSTRACT

A pressure controlled valve having a housing with a first pressure chamber for communication to a pneumatically pressurized control source. The housing has an inlet for communication with a pneumatic supply source and outlet selectively in fluid flow with the inlet. A movable valve selectively opens and closes with respect to a valve seat for selectively opening a pathway from the inlet to the outlet and closing the pathway between the inlet and outlet. The pressure chamber may be sealingly and fluidly separated from the pathway between the inlet and the outlet. The pressure chamber provides a closing biasing force on the movable valve and a resilient spring mounted in the housing provides an opening biasing force on the movable valve.

20 Claims, 4 Drawing Sheets

(56) References Cited

U.S. PATENT DOCUMENTS

| | | |
|---|---|---|
| 3,945,302 A | 3/1976 | Downs |
| 4,044,732 A | 8/1977 | Inada et al. |
| 4,130,267 A | 12/1978 | Inada et al. |
| 4,151,819 A | 5/1979 | Inada et al. |
| 4,180,096 A | 12/1979 | Johnson |
| 4,207,884 A | 6/1980 | Isaacson |
| 4,346,836 A * | 8/1982 | Nagel .................... A47J 27/62 126/374.1 |
| 4,574,826 A | 3/1986 | Johnson |
| 4,583,522 A | 4/1986 | Aronne |
| 4,596,360 A | 6/1986 | Cohen |
| 4,634,109 A | 1/1987 | Cigolotti et al. |
| 4,895,199 A | 1/1990 | Magnuson et al. |
| 5,423,342 A | 6/1995 | Fenner, Jr. |
| 5,447,174 A | 9/1995 | Bourkel et al. |
| 5,544,688 A | 8/1996 | Freigang et al. |
| 5,630,935 A | 5/1997 | Treu |
| 5,807,358 A | 9/1998 | Herweck et al. |
| 5,807,445 A | 9/1998 | Hoffmann |
| 5,845,675 A | 12/1998 | Ligh |
| 5,957,151 A | 9/1999 | Dalcourt et al. |
| 6,042,081 A | 3/2000 | Anderson |
| 6,227,520 B1 | 5/2001 | Huber, Jr. |
| 6,401,743 B1 | 6/2002 | Naedler |
| 6,427,714 B2 | 8/2002 | Freigang et al. |
| 7,422,612 B2 | 9/2008 | Pietschner |
| 7,717,682 B2 | 5/2010 | Orr |
| 7,766,028 B2 | 8/2010 | Massengale et al. |
| 7,878,479 B2 | 2/2011 | Yamamoto |
| 7,950,621 B2 | 5/2011 | Meinig et al. |
| 7,975,715 B2 | 7/2011 | Ramler et al. |
| 7,988,130 B2 | 8/2011 | Ohmi et al. |
| 2004/0060597 A1 | 4/2004 | Boulicault |
| 2009/0095359 A1 | 4/2009 | Campau |
| 2010/0147387 A1 | 6/2010 | Medley et al. |
| 2013/0092250 A1 | 4/2013 | Spielvogel et al. |

OTHER PUBLICATIONS

Search Report and Written Opinion of the International Search Authority, Application No. PCT/US2011/064813, Filing Date: Dec. 14, 2011, Mailing Date: Jul. 30, 2012, 12 pages.

EP Office Action, Application No. 11877251.6-1802/2791561; PCT/US2011/064813; Applicant: Numatics, Incorporated; Mailing Date: Dec. 10, 2015; 9 pages.

* cited by examiner

ADJUSTABLE PRESSURE CONTROLLED VALVE

TECHNICAL FIELD

The field of this invention relates to an adjustable pressure controlled valve and more particularly to an adjustable pressure controlled valve suitable for self-inflatable devices.

BACKGROUND OF THE DISCLOSURE

Pressure controlled pressure valves have wide applications. There are a few that are suitable for maintaining a set pressure for a pneumatic article for example, a pneumatic tire, pneumatic bed, and pressurized tanks. Many of these are diaphragm valves that only use the diaphragm as an actuator but another element, for example a poppet valve is used as the on/off valve.

Furthermore, there are situations where the pressure controlled valve is desired to be adjustable. One situation example is for self inflatable pneumatic tires. Tire companies make the same tire for a variety of makes and models of motor vehicles and the manufacturer of each make and model has its preferred set pressure. It is highly desired to have a pressure controlled valve that can be easily adjusted from the exterior of the valve housing to accommodate the different pneumatic pressures to eliminate the need to replace a valve regulator for each make and model. While adjustable regulators or pressure controlled valves are known, they are complicated devices that prevent usage in applications where an inexpensive and compact valve is required and they are not suitable for self-inflatable objects.

What is needed is a pressure controlled valve that is economical to build and is easily adjustable from its exterior to accommodate different pneumatic pressures for use in a self-inflatable object. What is also needed is a valve that is also used as a pressure actuator to reduce the number of parts and provide for a more economical valve. What is also needed is a pressure controlled valve that is suitable for use with two different fluids.

SUMMARY OF THE DISCLOSURE

In accordance with one aspect of the invention, an adjustable pressure controlled valve has a housing with a first bore. An inlet passage and outlet passage lead to and from the bore in the housing. The housing has a valve seat operably interposed between the inlet passage and outlet passage.

A valve member is mounted in the first bore and has a valve surface for seating on the valve seat when in a closed position and movable from the valve seat to an open position. The valve member has an opposite surface that is operably in communication to a pneumatic pressure for producing a closing force on the valve member. A resilient biasing member is mounted in the housing for exerting a opening biasing force on the valve member. An adjustment member is adjustably connected to the housing for adjusting the opening biasing force of the resilient biasing member.

Preferably, the resilient biasing member is in the form of a helical compression spring mounted in a second bore of the housing and is adjustably compressed between the valve member and the adjustment member.

The second bore has threads and the adjustment member is threadably engaged with the threads of the second bore for axial and rotational adjustment. The adjustment member is accessible for adjustment from an exterior of the housing.

In one embodiment, the valve member is a diaphragm valve that is flexible with its periphery fixedly mounted in the first bore and held in position by a cap member. The cap member has a vent therethrough for communication with a pressure source that exerts a closing biasing force to the diaphragm valve.

In accordance with another aspect of the invention, a pressure controlled valve has a housing with a pressure chamber for communication with a pneumatically pressurized control source. The housing has an inlet for communication with a pneumatic supply source and outlet selectively in fluid flow with the inlet and a valve seat. A movable valve is constructed to open and close with respect to the valve seat to selectively open a pathway from the inlet to the outlet and close the pathway between the inlet and outlet. The pressure chamber is sealingly and fluidly separated in the housing from the pathway between the inlet and outlet. The movable valve is constructed to respond to pneumatic pressure within the pressure chamber that provides a closing biasing force on the valve. A resilient spring is mounted in the housing to provide an opening biasing force on the movable valve. Preferably, the resilient spring is adjustable to provide an adjustable opening biasing force on the movable valve.

In one embodiment, the first bore and second bore are co-aligned with the valve seat interposed therebetween. The resilient spring is a helical compression spring seated on a lift rod member. The lift rod member is abutingly connected to a valve lifter member that directly abuts the diaphragm valve. One of the lift rod member and valve lifter member has at least one prong axially extending through at least one passage between the first and second bores.

In accordance with another aspect of the invention, a pressure controlled valve has a housing with a first pressure chamber for communication with a pneumatically pressurized control source. The housing has an inlet for communication with a pneumatic supply source and outlet selectively in fluid flow with the inlet. A movable valve opens and closes with respect to a valve seat of the housing to selectively open a pathway from the inlet to the outlet and close the pathway between the inlet and outlet. The pressure chamber is sealingly and fluidly separated from the pathway between the inlet and outlet. The movable valve is constructed to respond to pneumatic pressure within the pressure chamber that provides a closing biasing force on the movable valve. A resilient spring mounted in the housing provides an opening biasing force on the movable valve.

Preferably, the resilient spring is adjustable to provide an adjustable opening biasing force on the movable valve. In one embodiment, the movable valve is a diaphragm valve that is flexible with its periphery sealingly affixed in the housing. The diaphragm valve and the spring are co-aligned within the housing. In another embodiment, the movable valve is a piston type valve slidably mounted in the housing.

In accordance with another aspect of the invention, an adjustable pressure controlled valve has a housing with a valve seat and passage extending from an inlet to an outlet. A valve member is movable between an open position to a closed position with respect to the valve seat with one side of the valve member selectively seated on the valve seat when in the closed position. The housing has a pressure chamber on an opposite side of the valve member for exerting a closing bias on the valve member. An adjustable resilient spring member is in the housing and exerts an opening bias on the valve member. An adjustment member is axially movable relative to the housing by rotation with respect to the housing to adjust the resilient spring force exerted by the adjustable resilient spring member on the valve member. The adjustment member has circumferentially spaced grooves about a central axis and axially spaced shoulders at each end of the grooves. A spring detent clip is selectively engageable to one of the grooves to reduce the risk of inadvertent rotation of the adjustment member. The spring detent is also engageable with the axially spaced shoulders to define the range of axial motion of the adjustment member.

BRIEF DESCRIPTION OF THE DRAWINGS

Reference now is made to the accompanying drawings in which.

DETAILED DESCRIPTION OF THE PREFERRED EMBODIMENT

Figure 1:
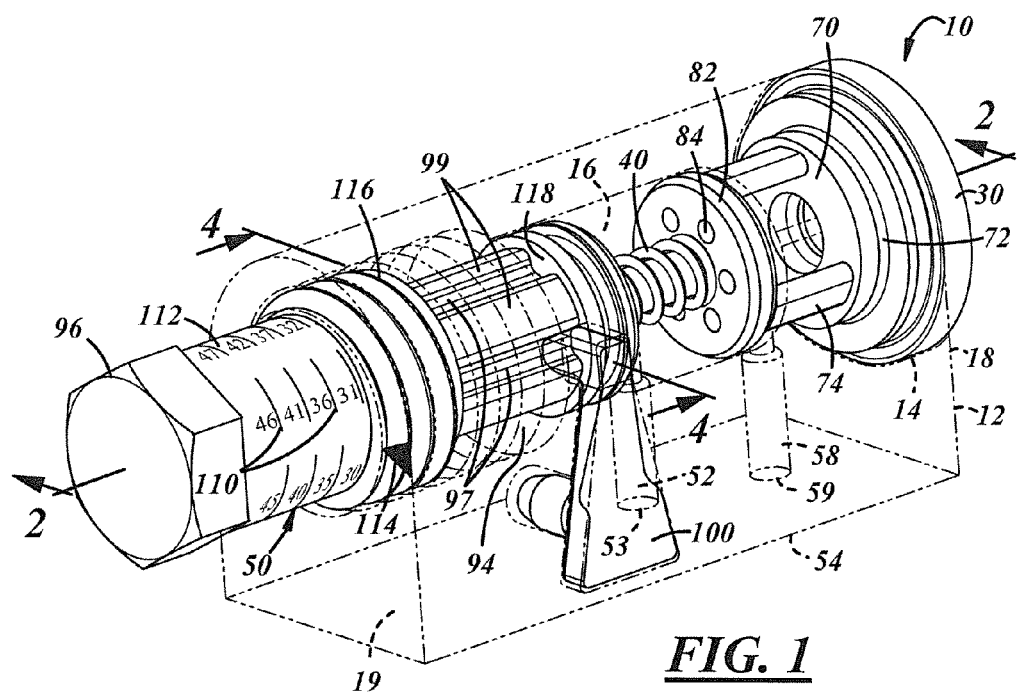
FIG. 1 is a perspective transparent view of one embodiment of a pressure controlled valve with the valve housing being transparent to illustrate its internally mounted parts and the adjuster set at about 30 PSI.
Figure 2:
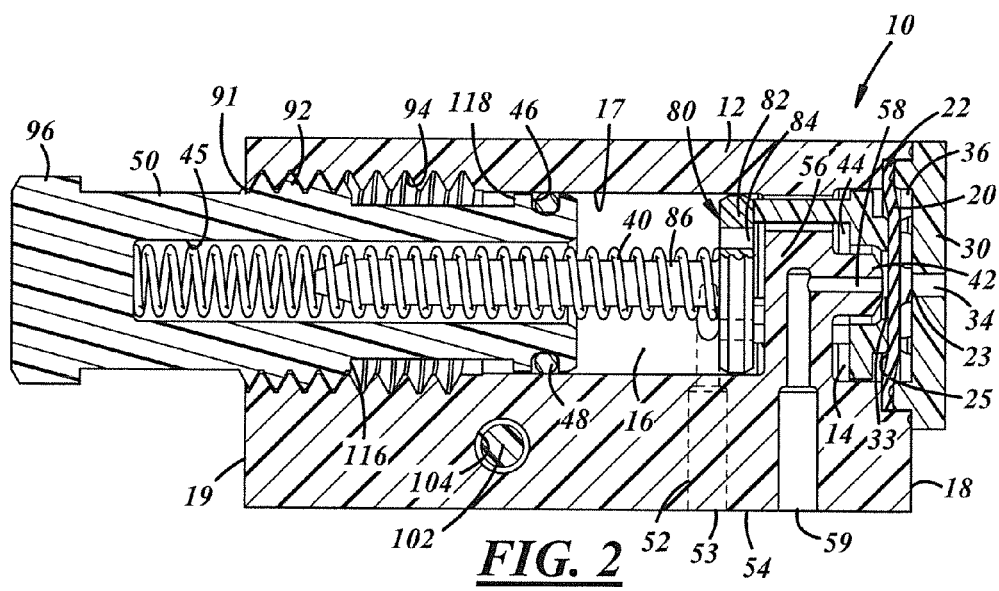
FIG. 2 is a cross-sectional view taken along the lines 2-2 shown in FIG. 1 illustrating the valve in an open position.
Figure 3:
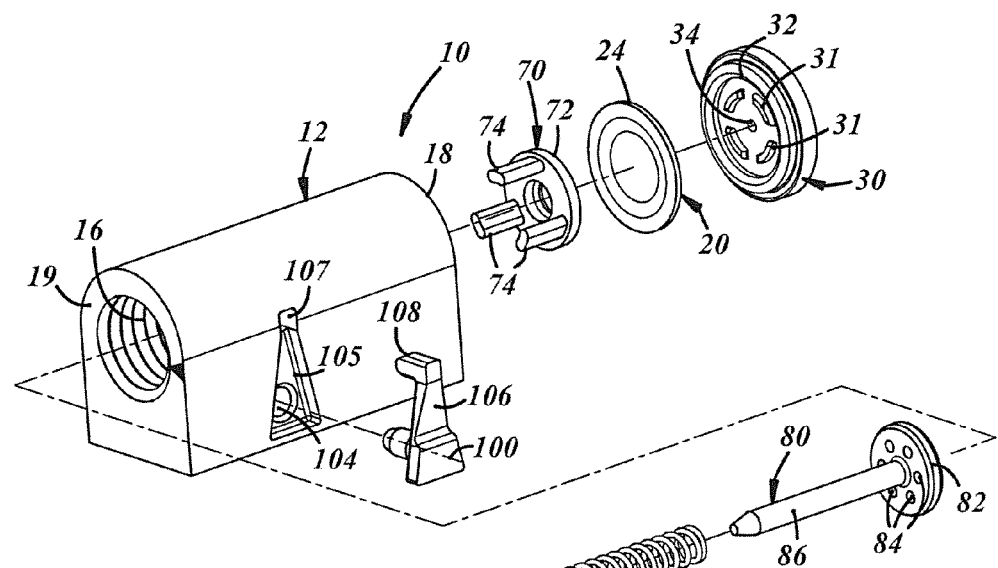
FIG. 3 is an exploded perspective view of the valve shown in FIG. 1.
Figure 3:
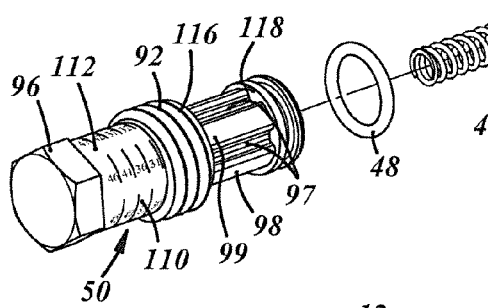

Referring now to FIGS. 1, 2 and 3, a valve 10 has a housing 12 with a first bore 14 and a second bore 16 at opposite ends 18 and 19 of housing 12. The first and second bores are co-aligned. A flexible diaphragm valve 20 is fitted in the first bore 14 and sealingly clamped in place by a cap member 30 secured to housing 12. The second bore 16 received a resilient helical spring 40 operably biased to move the diaphragm valve 20 away from valve seating surface 42 and is adjustably compressed by adjustment member 50 threadably engaged to the second bore 16 of the housing. The bores 14 and 16, spring 40, adjustment member 50, diaphragm valve 20 and caps 30 are all co-aligned in housing 12. A retaining clip 100 is mounted to the exterior of housing to retain the adjustment member 50 in the second bore 16 and to secure it against inadvertent rotation.

Figure 5:
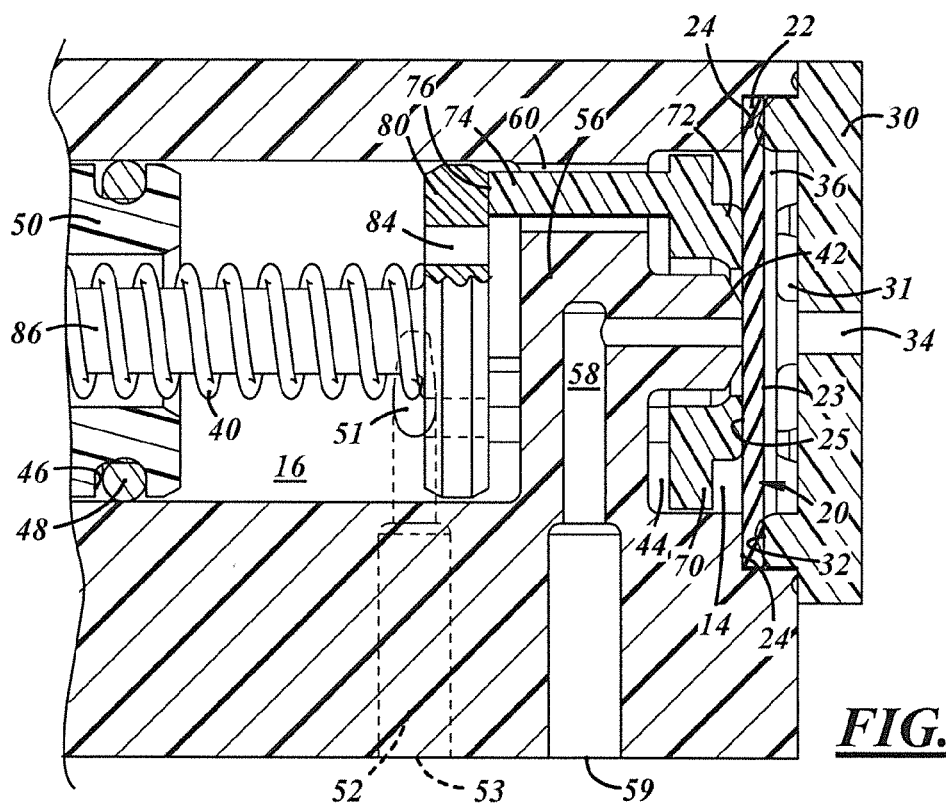
FIG. 5 is an enlarged fragmented side segmented view showing the valve in a closed position.

More particularly, as shown in FIGS. 2 and 5, the diaphragm valve 20 has a first pressure surface 23 and opposite facing second valve surface 25 and has its periphery 22 clamped in the first bore 14 between a shoulder 24 of housing and a shoulder 32 of cap member 30. The cap member 30 and diaphragm valve 20 form a pressure chamber 36 with housing 12 in first bore 14. The chamber 36 can be in fluid and pressure communication with a suitable pressurized pneumatic source (not shown) via a vent 34 through cap 30. The shown pneumatic source may be, for example, an interior of tire, interior of a pneumatic bed, pressure tank or other pressurized item.

The housing 12 has an inlet 53 leading to passage 52 from an exterior side wall 54 of the housing into the second bore 16 at downstream end 51. The inlet 53 can be in communication with a pneumatic source for example, ambient atmosphere.

The first and second bores 14 and 16 are separated from each other by a divider section 56 of housing 12 which provides the valve seating surface 42 thereon. The valve seating surface 42 surrounds an outlet passage 58 which has its downstream end 59 connectable to a pump (not shown) which then can lead to an item being pressurized, e.g. the interior of a pneumatic tire, a pneumatic bed, pressure tank or other inflatable or pressurizable item. The first bore 14 has an annular chamber section 44 surrounding the valve seating surface 42.

Figure 6:
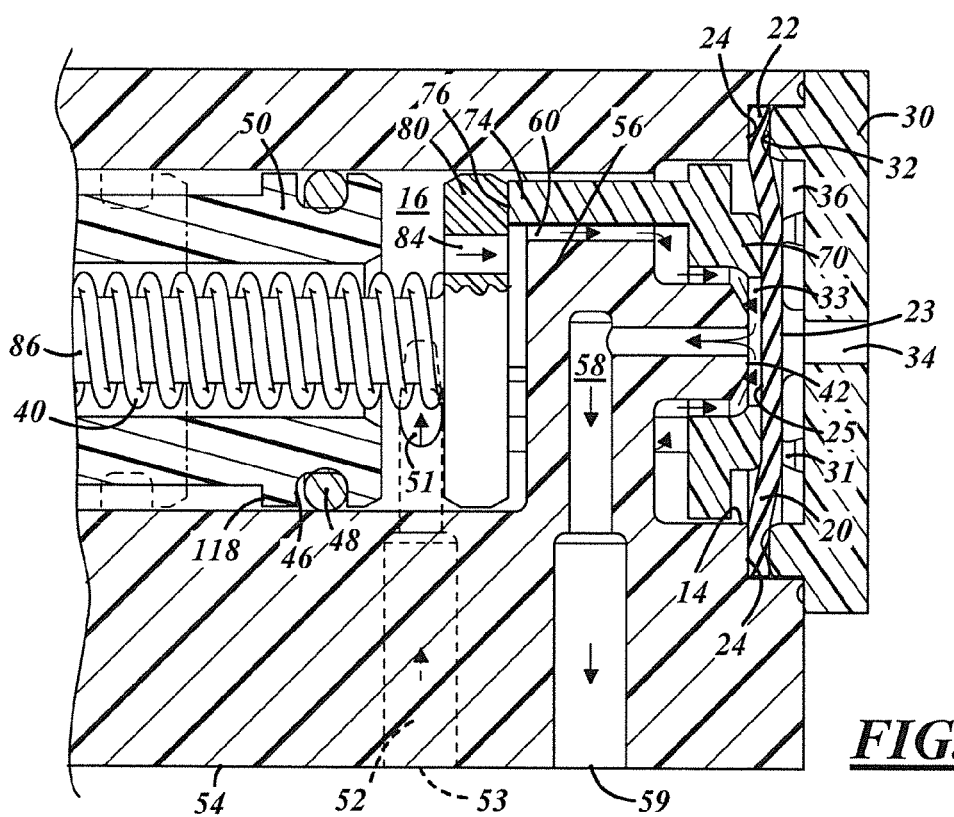
FIG. 6 is a view similar to FIG. 5 showing the adjustment member adjusted to a higher set pressure e.g. 50 PSI compared to the lower set pressure shown in phantom and the valve being in the open position.

The inlet passage 52 and outlet passage 58, when the diaphragm valve 20 is in the open position as shown in FIG. 2 or 6, are in communication with each other through three passages 60 through divider 56 of which one passage 60 is clearly illustrated for simplicity of the drawings. The passages 60 are circumferentially spaced about divider 56 and provide for free pneumatic flow between the first and second bores 14 and 16.

Furthermore, a valve lifter member 70 has an annular shaped end 72 sitting in annular section 44 about valve section surface 42 and abuts the diaphragm surface 25. The lifter member 70 has three prongs 74 that extend through the passages 60 in a sliding manner and are dimensioned to leave room for pneumatic flow through the passages 60. The prongs 74 have their respective distal ends 76 abut a lift rod member 80. The lift rod member 80 has a disc section 82 and a spring post 86. To prevent vacuum and pressure lock, the disc section 82 has apertures 84 therethrough. The helical spring 40 surrounds a spring post 86 of lift rod member 80 and sits against the back surface 88 of the disc section 82.

The adjustment member 50 has an inner hole 45 that receives both the post 86 and spring 40. The inner hole 45 also seats the distal end of the spring 40. The adjustment member 50 near its inner end also has a groove 46 that seats a gasket 48 to allow the adjustment member 50 to slidably and sealingly engage the inner wall 17 of second bore 16 to prevent pneumatic leakage out rear threaded end 91 of housing 12. The adjustment member 50 has threads 92 that engage complementary housing threads 94 at rear end section 91 of inner wall 17 about the second bore 16. The adjustment member 50 has an enlarged head 96 that is constructed to be manually engaged for rotation to adjust the compression of the spring 40. The head 96 may be hex shaped as illustrated to be engaged by a wrench. It may in addition or alternately have an outer knurl to be manually grabbed or have a slot or Phillips screwdriver slot to be engaged by a screwdriver or Phillips head screw driver to facilitate manual rotation of the adjustment member.

Figure 4:
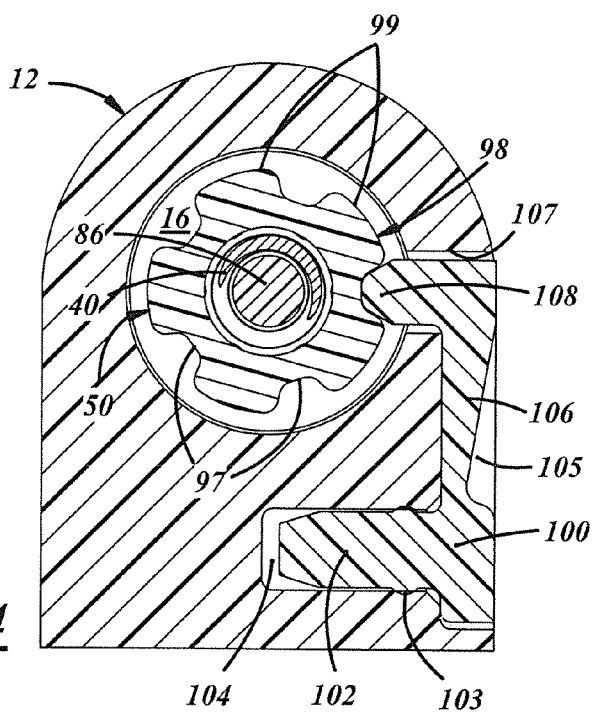
FIG. 4 is a cross-sectional view taken along lines 4-4 shown in FIG. 1.

As best shown in FIGS. 1, 3 and 4, besides the threads 92, axially and rotational motion of the adjustment member 50 is controlled by its splined section 98 between shoulders 116 and 118 with five circumferentially spaced grooves 97 and ribs 99 axially extending between the gasket 48 and threads 92 and the clip 100. The clip 100 has a mounting peg 102 securely mounted in hole 104 of housing 12 through a tight press fit with circumferential protuberance 103 of peg 102 engaging hole 104. The clip has a flexible arm 106 seated in a recess 105 in housing 12 with a distal tapered tip 108 that extends through opening 107 and that is biased radially inward to engage one of the grooves 97 to act as a detent. The arm 106 can flex to allow the tip to move radially outward to disengage out of groove 97.

Calibrated pressure indicia 110 may be laser etched onto the outer side wall 112 of the adjustment member between the threads 92 and enlarged head 96. The indicia may be etched along a helical curve such that the set pressure is always at a fixed rotated angle with respect to the housing. The calibrated indicia 110 that is set is positioned axially directly at the end 19 of the housing 12 and can be calibrated to be radially positioned in proximity to an indicator arrow 114.

In operation, the adjustment member 50 is manually rotated such that the threads 92, 94 axially move the adjustment member to the desired axial position to compress the spring 40 which corresponds to a set pressure for example 30 PSI as shown in FIG. 1. As the adjustment member 50 is turned, the ribs 99 engage and push out the distal tip 108 of clip 100 from a groove 97 and the tip 108 then clicks back into a sequential groove 97. Each click is calibrated to correspond to a change of one PSI, in other words, a full rotation of the adjustment member is calibrated to be five PSI increase or decrease depending on the direction. For typical applications, the PSI indicia may range from 30 to 50 PSI. A typical range may provide for about four full rotations or a range of 20 PSI. FIGS. 1, 2 and 5 illustrate the adjustment member set at approximately the typical minimum adjusted set pressure, e.g. 30 PSI and FIG. 6 illustrates the adjustment member set at the typical maximum adjusted set pressure, e.g. 50 PSI.

Not only may an operator hear the click as the adjustment member 50 is rotated, but in noisy environments such as an active commercial garage, the operator may feel the clicks through the wrench and even place his finger on the spring arm 106 and feel the arm move radially in and out to keep track of the clicks and thereby the PSI adjustment. Once set, the tip 108 stays in the groove to act as a detent and serves to prevent inadvertent rotation of the adjustment member.

As best shown in FIGS. 1 and 3, the clip 100 also functions as a stop by having tip 108 abutting internal shoulders 116 and 118 at the opposite ends of the splined section 98 to prevent excessive rotation or axial motion of the adjustment member too far outward to disengage from threads 94 and too far inward which may otherwise permanently deform spring 40 beyond it resilient range.

If pressure in chamber 36 is less than the set pressure as indicated by the adjustment member, the resilient spring biases the lift rod member 80 and pushes the valve lifter 70 to unseat the diaphragm valve 20 from valve seat surface 42 until the diaphragm abuts stops 31 on cap 30 creating open pathway passage 33 between inlet 53 and outlet 59. At this position, the valve is opened as illustrated in FIG. 2 or FIG. 6. This allows the pump (not shown) to pump air from atmosphere that flows from inlet 59 through the valve through open pathway 33 and to outlet passage 58 and then to the pump and into the interior air of the pneumatic inflatable bed, tire, pressure tank or other inflatable or pressurizable object.

Referring now to FIG. 5, if the pressure in chamber 36 is equal to or more than the set pressure as indicated by the adjustment member, the pressure in chamber 36 acts on diaphragm valve 20 and overcomes the bias of the resilient spring 40 and pushes against the lift rod member 80 and pushes the valve lifter 70 to compress the helical spring 40 until the diaphragm valve 20 becomes seated onto valve seat surface 42 which closes the valve by interrupting or closing pathway 33. The pump (not shown) may continue to operate but, intake passage 58 is closed, so the pump will only draw vacuum.

FIG. 6 illustrates the adjustment member 50 screwed down to higher set pressure position e.g. 50 PSI which further compresses spring 40 which therefore exerts great opening pressure through valve lifter 70 onto diaphragm valve 20. At this position, it takes greater pressure e.g. 50 PSI within chamber 36 to overcome the opening bias of spring 40 to close diaphragm 20 onto valve surface 42 as compared to the 30 PSI position shown in phantom.

In operation, pneumatic flow within housing 12 from inlet 53 through valve seat 42 and out to outlet 59 does not mix with and is completely separated from pressure chamber 36. Because of the separation of the pressure chamber 36 from passages 52, 59 and 60 and chamber 3, the valve is suitable to be used where the pneumatic supply source may be different than the pneumatically pressurized control source, i.e. the gas in chamber 36. One pneumatic source is used as the pressure controlling source e.g. the pneumatic fluid in chamber 36, and one pneumatic supply system has controlled flow from inlet 52 to outlet 59.

On the other hand, when outlet 59 of the valve leads through a pump to an inflatable device for example a pneumatic tire, pneumatic bed or pressure tank, which is in fluid communication with chamber 36, the pressure controlled valve provides feedback through chamber 36 to control the pressure in the inflatable device.

Figure 7:
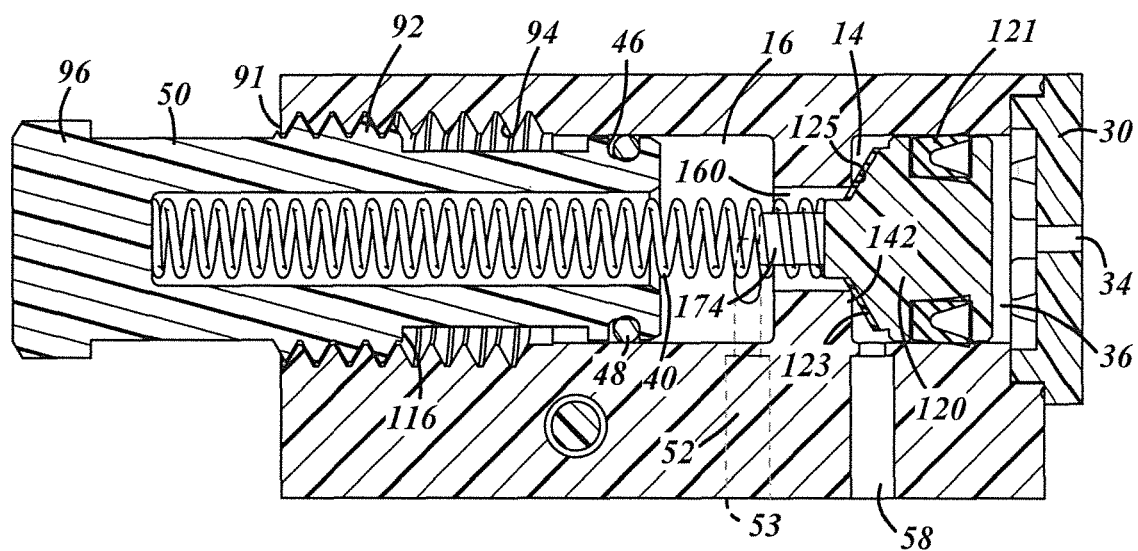
FIG. 7 is a segmented view similar to FIG. 2 showing an alternate embodiment.

Referring now to FIG. 7, an alternate embodiment is disclosed. Unchanged or substantially similar parts will bear the same numerals as mentioned before. In this embodiment, the diaphragm valve 20, valve lifter member 70 and lift rod member have all been replaced by slidable piston valve 120 that is slidably and sealably mounted in the first bore 14. The slidable piston valve 120 has an annular sealing gasket 121 to provide the sliding seal.

The slidable piston valve 120 has a frusto-conical shaped valve surface 123 that has an elastomeric overmold section 125 thereon. A divider section 156 has a single central passage 160 with an annular valve seat 142 thereabout. Outlet passage 58 extends from the first bore 14.

The slidable piston valve has a central leg 174 that extends through the central passage 160. The leg 174 has a diameter sized smaller that the diameter of central passage 160 to allow pneumatic flow through passage 160 from the second bore 16 to the first bore 14. The leg 174 extends into the helical spring 40. The helical spring 40 directly biases the piston valve 120 to an open position.

The remaining parts are substantially the same as the parts described for the first embodiment and will not be described again.

In operation when sufficient pneumatic pressure is in pressure chamber 36, the slidable piston valve overcomes the opening bias of helical spring 40 to seat the frusto-conical valve surface 123 onto valve seat 142 and close off outlet passage 158 from inlet 63 and passage 52 as shown in FIG. 7.

When the pressure in chamber 36 drops to below the adjusted opening bias of helical spring 40, the spring 40 moves the piston valve to the open position and provides fluid communication from inlet 53 and passage 52 through passage 160 and to outlet passage 58.

Other variations of the various parts are foreseeable for this invention. For example, the prongs 74, instead of being integral with valve lifter 70, may be integral with valve lifter rod 80. Furthermore, the prongs 74 as part of valve lift rod member 80 may directly abut the diaphragm and be used to lift the diaphragm off the valve seat to the open position. The three prongs may also be replaced by a centrally located prong that has a flow passage therethrough rather than about it. The piston valve surface 123 may have other shapes for example, an annular disc shape. The helical spring may be replaced by other kinds of springs or resilient members for example, an elastomeric plug. The resilient member rather than being a compression member in the second bore may be a resilient tension member mounted in the pressure chamber that still biases the valve member to the open position.

Other variations and modifications are possible without departing from the scope and spirit of the present invention as defined by the appended claims.

The invention claimed is:
1. An adjustable pressure controlled valve comprising:
a housing;
a first bore in said housing;
an inlet passage leading to said first bore and an outlet passage leading from said first bore in said housing;
said housing having a valve seat operably interposed between said inlet passage and said outlet passage of said housing;
a valve member mounted in said first bore having a valve surface for seating on said valve seat when in a closed position and movable from said valve seat to an open position for selectively opening and closing fluid communication between said inlet passage and said outlet passage;
said valve member having an opposite surface that is operably in communication to pressure exerted on said opposite surface, for producing a closing biasing force on said valve member;
a resilient biasing member mounted in said housing and positioned operably in a pathway fluidly connecting said inlet passage to said first bore for creating and exerting an opening biasing force on said valve member; and
an adjustment member adjustably connected to said housing for adjusting the opening biasing force of said resilient biasing member.

2. An adjustable pressure controlled valve as defined in claim 1 further comprising:
said resilient biasing member being a helical compression spring mounted in a second bore forming part of said pathway in said housing and being adjustably compressed between said valve member and said adjustment member.

3. An adjustable pressure controlled valve as defined in claim 2 further comprising:
said second bore having threads; and
said adjustment member being threadably engaged with said threads of said second bore and being accessible for adjustment from an exterior of said housing.

4. An adjustable pressure controlled valve as defined in claim 2 further comprising:
said first bore and second bore being co-aligned with said valve seat interposed therebetween.

5. An adjustable pressure controlled valve as defined in claim 4 further comprising:
said helical compression spring seated on a lift rod member;
said lift rod member abutingly connected to a valve lifter member that directly abuts the valve surface of said valve member; and
one of said lift rod member and valve lifter member having at least one prong axially extending through at least one passage between said first bore and said second bore.

6. An adjustable pressure controlled valve as defined in claim 1 further comprising:
said adjustment member being threadably engaged with said housing for rotational and axial motion to adjust the opening biasing force exerted by said resilient biasing member on said valve member;
said adjustment member having circumferentially spaced grooves about a central axis that axially extend along said central axis, and axially spaced radially extending shoulders at each end of said grooves with said grooves axially extending between said shoulders;
a spring detent clip selectively engageable to one of said grooves axially therealong to secure said adjustment member against inadvertent rotation; and
said spring detent clip being axially affixed with respect to said housing and engageable with said axially spaced shoulders to define the range of axial motion of said adjustment member with respect to said housing.

7. An adjustable pressure controlled valve as defined in claim 1 further comprising:
said valve member being a diaphragm valve that is flexible with a periphery fixedly mounted in said first bore and held in position by a cap member; and
said cap member having a vent therethrough for communication with a pressure source that exerts a closing biasing force on said diaphragm valve.

8. An adjustable pressure controlled valve as defined in claim 1 further comprising:
said valve member being a piston sealingly and slidably mounted in said first bore; and
said piston having a valve seating surface that selectively seats on said valve seat to close said valve member.

9. An adjustable pressure controlled valve as defined in claim 8 further comprising:
said piston having a leg section that extends through a valve passage through said valve seat and seats on said resilient biasing member mounted in second bore such that said piston is biased to the open position by said resilient biasing member.

10. An adjustable pressure controlled valve as defined in claim 9 further comprising:
said adjustment member being threadably engaged with said housing for rotational and axial motion to adjust the opening biasing force exerted by said resilient biasing member on said valve member;
said adjustment member having circumferentially spaced grooves about a central axis that axially extend along said central axis, and axially spaced radially extending shoulders at each end of said grooves with said grooves axially extending between said shoulders;
a spring detent clip selectively engageable to one of said grooves axially therealong to secure said adjustment member against inadvertent rotation; and
said spring detent clip being axially affixed with respect to said housing and engageable with said axially spaced shoulders to define the range of axial motion of said adjustment member with respect to said housing.

11. An adjustable pressure controlled valve as defined in claim 8 further comprising:
said adjustment member being threadably engaged with said housing for rotational and axial motion to adjust the opening biasing force exerted by said resilient biasing member on said valve member;
said adjustment member having circumferentially spaced grooves about a central axis that axially extend along said central axis, and axially spaced radially extending shoulders at each end of said grooves with said grooves axially extending between said shoulders;
a spring detent clip selectively engageable to one of said grooves axially therealong to secure said adjustment member against inadvertent rotation; and said spring detent clip being axially affixed with respect to said housing and engageable with said axially spaced shoulders to define the range of axial motion of said adjustment member with respect to said housing.

12. A pressure controlled valve comprising:
a housing having a pressure chamber for communication with a pneumatically pressurized control source;
said housing having an inlet for communication with a pneumatic supply source and an outlet selectively in fluid flow with said inlet;
a valve seat in said housing;
a movable valve for opening and closing with respect to said valve seat to selectively open a pathway from said inlet to said outlet and close said pathway between said inlet and said outlet;
said pressure chamber being sealingly and fluidly separated from said pathway between said inlet and said outlet in said housing;
said movable valve constructed to respond to pneumatic pressure within said pressure chamber from said pneumatically pressurized control source that provides a closing bias force;
a spring mounted in said housing creating and providing an opening biasing force on said movable valve; and
said pneumatically pressurized control source being in communication with an inflatable device which is in communication with said outlet to provide feedback through the pressure control chamber to control pressure in said inflatable device.

13. A pressure controlled valve as defined in claim 12 further comprising:
said housing having an adjustment member operable from the exterior to adjust said spring to provide an adjustable opening biasing force on said movable valve.

14. A pressure controlled valve as defined in claim 12 further comprising:
said movable valve being a diaphragm valve that is flexible with a periphery sealingly affixed in said housing.

15. A pressure controlled valve as defined in claim 14 further comprising:
said diaphragm valve and said spring being co-aligned in a respective aligned first and second bore in said housing.

16. A pressure controlled valve comprising:
a housing having a pressure chamber for communication with a pneumatically pressurized control source;
said housing having an inlet for communication with a pneumatic supply source and an outlet selectively in fluid flow with said inlet;
a valve seat in said housing;
a movable valve for opening and closing with respect to said valve seat to selectively open a pathway from said inlet to said outlet and close said pathway between said inlet and said outlet;
said pressure chamber being sealingly and fluidly separated from said pathway between said inlet and said outlet in said housing;
said movable valve constructed to respond to pneumatic pressure within said pressure chamber that provides a closing bias force;
a spring mounted in said housing providing an opening biasing force on said movable valve;
an adjustment member being threadably engaged with said housing for rotational and axial motion to adjust the opening biasing force exerted by said spring on said movable valve;

said adjustment member having circumferentially spaced grooves about a central axis that axially extend along said central axis, and axially spaced radially extending shoulders at each end of said grooves with said grooves axially extending between said shoulders;
a spring detent clip selectively engageable to one of said grooves axially therealong to secure said adjustment member against inadvertent rotation; and
said spring detent clip being axially affixed with respect to said housing and engageable with said axially spaced shoulders to define the range of axial motion of said adjustment member with respect to said housing.

17. An adjustable pressure controlled valve comprising:
a housing with a valve seat and passage extending from an inlet to an outlet;
a valve member movable between an open position to a closed position with one side of said valve member selectively seated on said valve seat when in the closed position;
said housing having a pressure chamber on an opposite side of said valve member for exerting a closing bias on said valve member;
an adjustable resilient spring member exerting an opening bias on said valve member;
an adjustment member axially movable relative to said housing by rotation with respect to said housing to adjust the opening bias exerted by said adjustable resilient spring member on said valve;
said adjustment member having circumferentially spaced grooves about a central axis that axially extend along said central axis and axially spaced radially extending shoulders at each end of said grooves with said grooves axially extending between said shoulders;
a spring detent clip selectively engageable to one of said grooves axially therealong to secure said adjustment member against accidental rotation; and
said spring detent clip being axially affixed with respect to said housing and engageable with said axially spaced shoulders to define the range of axial motion of said adjustment member with respect to said housing.

18. A pressure controlled valve as defined in claim 16 further comprising:
said spring being mounted in said pathway between said inlet and said outlet.

19. An adjustable pressure controlled valve comprising:
a housing;
an inlet passage leading to an interior cavity in said housing and an outlet passage leading from said interior cavity in said housing;
a pathway formed by said inlet passage, said interior cavity and said outlet;
said housing having a valve seat operably interposed between said inlet passage and said outlet passage in said pathway of said housing;
a valve member mounted in said interior cavity having a valve surface for seating on said valve seat when in a closed position and movable from said valve seat to an open position for selectively opening and closing fluid communication between said inlet passage and said outlet along said pathway;
said valve member having an opposite surface that is operably in communication to pressure exerted on said opposite surface, for producing a closing biasing force on said valve member;
a resilient biasing member mounted in said pathway for creating and exerting an opening biasing force on said valve member; and an adjustment member adjustably connected to said housing for adjusting any closing biasing force exerted by said pressure needed to overcome the opening biasing force of said resilient biasing member.

20. An adjustable pressure controlled valve as defined in claim 19 further comprising:
said adjustment member being threadably engaged with said housing for rotational and axial motion to adjust the opening biasing force exerted by said resilient biasing member on said valve member;
said adjustment member having circumferentially spaced grooves about a central axis that axially extend along said central axis, and axially spaced radially extending shoulders at each end of said grooves with said grooves axially extending between said shoulders;
a spring detent clip selectively engageable to one of said grooves axially therealong to secure said adjustment member against inadvertent rotation; and
said spring detent clip being axially affixed with respect to said housing and engageable with said axially spaced shoulders to define the range of axial motion of said adjustment member with respect to said housing.

\* \* \* \* \*